United States Patent [19]
Gidley

[11] Patent Number: 5,232,050
[45] Date of Patent: Aug. 3, 1993

[54] CONDITIONING OF FORMATION FOR SANDSTONE ACIDIZING

[76] Inventor: John L. Gidley, 5211 Caversham Ave., Houston, Tex. 77096

[21] Appl. No.: 856,687

[22] Filed: Mar. 24, 1992

Related U.S. Application Data

[63] Continuation-in-part of Ser. No. 631,325, Dec. 20, 1990, Pat. No. 5,099,924.

[51] Int. Cl.5 .................................................. E21B 43/27
[52] U.S. Cl. ....................................... 166/307; 166/312
[58] Field of Search ...................... 166/271, 307, 312; 252/8.553

[56] References Cited

U.S. PATENT DOCUMENTS

| | | | |
|---|---|---|---|
| 2,308,414 | 1/1943 | Campbell | 166/307 |
| 2,885,004 | 5/1959 | Perry | 166/307 |
| 3,254,718 | 6/1966 | Dunlap | 166/307 |
| 3,481,404 | 12/1969 | Gidley | 166/307 |
| 3,504,747 | 4/1970 | Vogt, Jr. et al. | 166/307 |
| 3,543,856 | 12/1970 | Knox et al. | 166/307 X |
| 3,568,772 | 3/1971 | Gogarty et al. | 166/307 X |
| 3,831,679 | 8/1974 | Presley et al. | 166/307 |
| 3,902,557 | 9/1975 | Shaughessy et al. | 166/307 X |
| 3,915,233 | 10/1975 | Slusser | 166/307 |
| 4,414,118 | 11/1983 | Murphey | 166/307 X |
| 4,436,156 | 3/1984 | Fredrickson | 166/307 |
| 4,882,075 | 11/1989 | Jones | 166/307 X |
| 4,886,609 | 12/1989 | Walton | 252/8.553 X |
| 4,964,467 | 10/1990 | Hotmyer et al. | 166/271 X |
| 5,099,924 | 3/1992 | Gidley | 166/312 |

*Primary Examiner*—George A. Suchfield
*Attorney, Agent, or Firm*—R. L. Graham

[57] ABSTRACT

A damaged zone of a subterranean oil-bearing formation is treated with four fluids:
(a) an acid preflush; (b) solvent; (c) a formation conditioning fluid, preferably carbon dioxide, to miscibly displace oil from the damaged zone; and (d) a mud acid.

11 Claims, 1 Drawing Sheet

CONDITIONING OF FORMATION FOR SANDSTONE ACIDIZING

CROSS-REFERENCE TO RELATED APPLICATIONS

This Application is a continuation-in-part of Application Ser. No. 631,325, filed Dec. 20, 1990, now U.S. Pat. No. 5,099,924.

FIELD OF INVENTION

This invention relates generally to acidizing in oil producing sandstone formations. In one aspect it relates to a method of conditioning a sandstone formation to improve the effects of acid. In still another aspect, the invention relates to the use of carbon dioxide as a conditioning agent for acidizing subterranean sandstone formations.

BACKGROUND OF THE INVENTION

Sandstone acidizing is a stimulation treatment which involves the injection of an acid into the formation at matrix pressures (i.e., below that which fractures the formation) to react with formation materials such as sand, clays, drilling fluid, cement filtrate, and the like. The treatment normally involves the sequential injection of three fluids:

(1) Preflush: An aqueous acid solution, usually HCl, is injected to displace connate water from the near wellbore region and to react with calcite or other calcareous materials in the formation.

(2) Mud acid: Immediately following the preflush, an acid capable of reacting with siliceous constituents in the formation is injected. The acid generally is a mixture of HF and HCl, typically an aqueous solution of 3% HF and 12% HCl. The HF reacts with clays, sand, drilling mud and cement filtrate; whereas the main function of the HCl is to keep the pH low.

(3) Afterflush: The mud acid treatment is followed by an afterflush to displace the mud acid into the formation and restore water wetability to the formation and acid reaction products.

The effectiveness of sandstone acidizing is dependent upon the ability of the mud acid to improve formation permeability by reacting with formation materials. Over the years it has been observed that gas wells and oil wells respond differently to sandstone acid treatments. Studies have shown that gas well stimulation by sandstone acidizing is generally proportional to the volume of mud acid employed; whereas oil well stimulation responds proportionately only to relatively low acid volumes. Medium to high volume treatments of mud acid frequently do not provide additional benefits and in fact sometimes reduce stimulation.

Some studies indicate that the decline in acid stimulation in oil wells may be caused by disintegration of the sandstone matrix due to acid reaction. Although this mechanism may be operative, it does not explain the difference between gas well and oil well response to sandstone acid treatments. It appears that the disintegration of the matrix would occur in both types of sandstone formations.

As mentioned above and as described in more detail below, the method of the present invention employs a solvent in advance of the mud acid in the treatment to condition the formation and improve its response to the mud acid treatment.

Prior art which discloses the use of solvents in well acidizing operations include U.S. Pat. Nos.: 3,254,718, 3,481,404, 3,548,945, 3,902,557, 3,970,148, and 4,823,874.

The method disclosed in U.S. Pat. No. 3,254,718 involves the use of solvents in a preflush of an acid treatment for calcareous formations. As is well known in the industry, calcareous formations and sandstone formations have different properties which require different acid treatments. For example, calcareous materials have a positive surface charge at a pH below 8 which makes them oil wet; whereas sands have a negative surface charge making them water wet. Moreover entirely different acids are used in each, with HCl predominating in the acid treatment of calcareous formations and mud acid in the treatment of sandstone formations. The different acid reactions produce totally different reaction products, which require different treatments to avoid adverse effects to the acid reaction products.

U.S. Pat. Nos. 3,481,404 and 3,548,945 disclose the use of solvents in sandstone acid solutions, or in the afterflush of such acid solutions.

U.S. Pat. No. 3,902,557 discloses the use of solvents in the acid solution or afterflush in sandstone acidizing to prevent the occurrence of emulsion blocks.

U.S. Pat. No. 3,970,148 discloses an acidizing method involving the sequential injection of an aromatic solvent preflush and an alcohol-acid solution.

U.S. Pat. No. 4,823,874 discloses the use of certain antisludging agents in the acid solution of well acidizing compositions.

SUMMARY OF THE INVENTION

Figure 1:
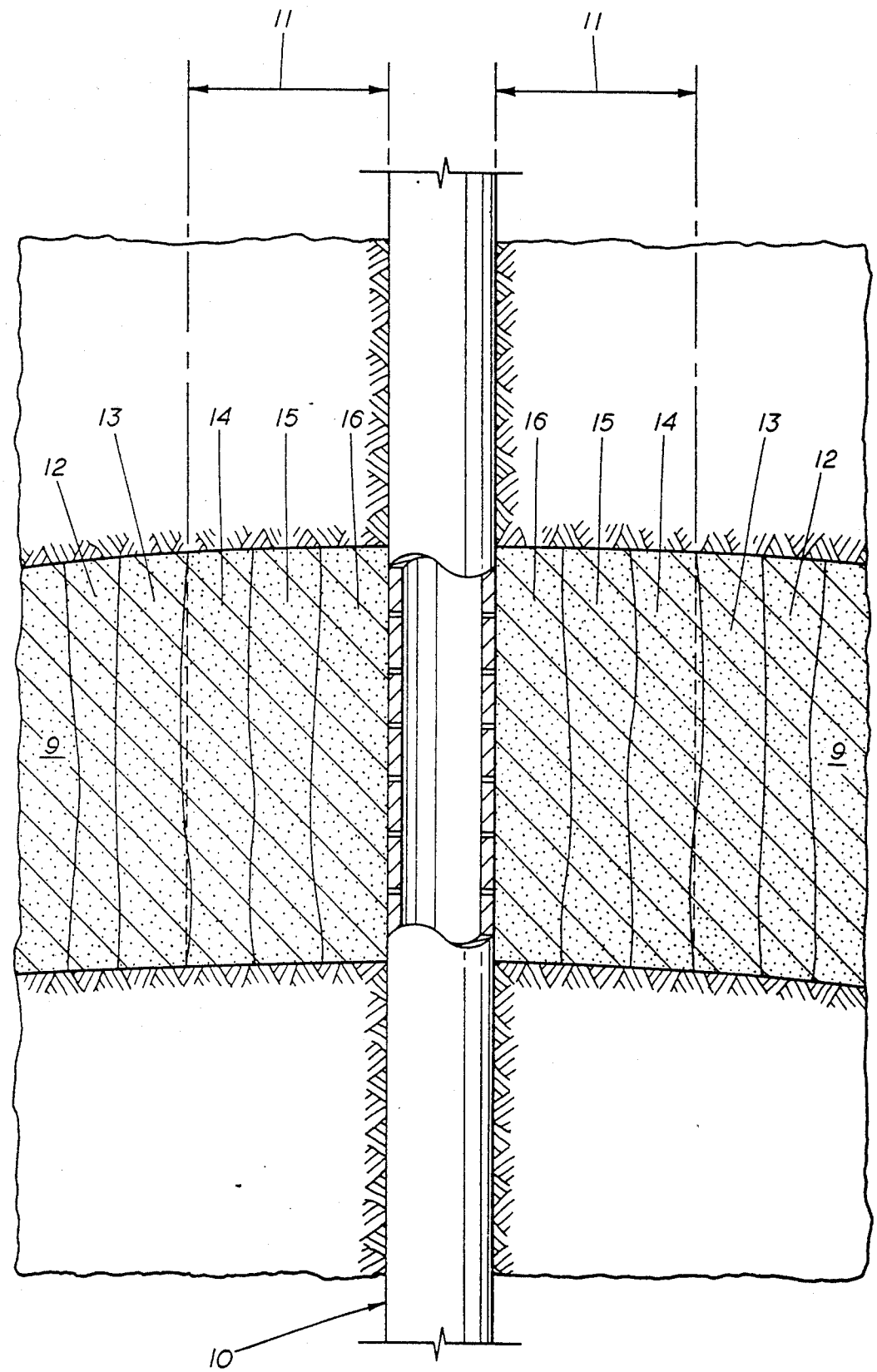
FIG. 1 is a schematic view of a well illustrating the injection sequence of the four stages used in the present invention.

It has been discovered that by preconditioning the sandstone oil-bearing formation, a sandstone acidizing treatment in the formation can be significantly improved. The method of the present invention involves the steps of injecting into a sandstone formation at matrix injection rates the following fluids:

(a) a solvent having solvency for oil in the formation and the conditioning fluid;

(b) a conditioning fluid (i.e., carbon dioxide or mixtures containing carbon dioxide) to miscibly displace and remove the oil from the zone to be acidized;

(c) an aqueous acid preflush; and (d) an aqueous solution of mud acid.

The preferred sequence for injecting the fluids is as follows: the aqueous acid preflush, followed by the solvent, followed by the conditioning fluid, and finally, the mud acid. Alternatively, the acid preflush can be injected immediately in advance of the mud acid. It is also preferred to inject an afterflush after the mud acid.

The preferred conditioning fluid is carbon dioxide. Mutual solvents, or partial mutual solvents for both oil and water, and micellar solvents are also useful in combination with the carbon dioxide.

It is believed that the conditioning fluid displaces the oil outwardly from the zone to be treated thereby effectively eliminating the mixing of oil and mud acid or mud acid reaction products. Without the conditioning fluid treatment, oil left in the invaded region interacts with the mud acid and contacts the newly created surfaces (e.g., sand or precipitated reaction products of HF and silica such as hydrous silica and ortho-silicic acid) and tenaciously adheres thereto. This tends to render the new surfaces oil wet, leading to cleanup problems in the zone treated.

It is important in carrying out the method of the present invention to separate the reactive mud acid from the oil solubilized by the conditioning solvent solution to eliminate or minimize the interaction between these materials. Such interaction often creates materials that remain in the formation after the acid treatment and reduce well productivity. An intermediate fluid such as an acid preflush or excess solvent may be used so that very little oil collects at the interface of the mud acid and preceding fluid.

DESCRIPTION OF THE PREFERRED EMBODIMENTS

With reference to FIG. 1, a sandstone oil-bearing subterranean formation 9 is schematically illustrated as being penetrated by wellbore 10. The critical radial flow area from the formation 9 to the wellbore 10 is in the near-wellbore region which extends a short distance 11 from the wellbore. This is the region most likely to be damaged during the drilling or completion process, and the removal of this damage requires the effective use of acids reactive with clays and the silicate minerals that are involved in the wellbore damage process. The extent of the near-wellbore region can vary within a wide range depending on several factors such as formation permeability, mineralogy of the formation, duration of the drilling process exposing the zone to the drilling operation, etc. For most wells, however, the near-wellbore region ranges from a few inches to a few feet (generally less than 2 or 3 feet) from the wellbore.

The main purpose of sandstone acidizing treatments is to improve the permeability in the near-wellbore region by removing damage (e.g., drilling mud solids, altered formation clays, and other effects of drilling mud and cement filtrates) or removing migrating formation fines that have penetrated this region, (e.g., clays and formation detritus) or by creating or increasing the size of flow channels in the porous sandstone. All of these mechanisms may be involved in sandstone acidizing.

In accordance with the preferred method of the present invention, the sandstone acidizing treatment involves injecting a series of fluids into the formation 9 via borehole 10 as described below.

(a) Injecting an aqueous acid preflush solution into the formation to form a preflush bank 12 to displace formation fluids radially outwardly into the undamaged formation 9.

(b) Injecting a solvent into the formation. The solvent injection forms bank 13 which displaces the acid preflush outwardly into the formation. The solvent is selected to have solvency for both formation oil and the conditioning fluid.

(c) Injecting a formation conditioning fluid to miscibly displace indigenous oil and solvent from the formation to be acidized to form a bank 14.

(d) Injecting a mud acid solution into the formation sufficient to dissolve the clays and formation fines within the damaged zone and to form a bank 15 which displaces the preceding banks 12,13 and 14 farther outwardly into the formation 10.

(e) Finally, injecting an afterflush into the formation 10 to form bank 16 which displaces preceding banks 12,13,14, and 15 radially outwardly farther into the formation, and to accomplish further wettability adjustments required to increase the relative permeability of the formation to the oil present in it.

As mentioned previously, the acid preflush, alternatively, can be injected after the conditioning fluid in advance of the mud acid.

The compositions of, and injection techniques for, the preflush solution, the solvent, the mud acid solution, and the afterflush solution can be generally in accordance with prior art techniques, particularly those described in Chapter 9 of *Acidizing Fundamentals*, by B. B. Williams, J. L. Gidley, and R. S. Schechter, the disclosure of which is incorporated herein by reference. The description of the present invention will include a brief description of these solutions with particular emphasis on the formation conditioning phase of the process.

The Solvent: The solvent is injected in advance of the carbon dioxide to enhance solubilization of the indigenous hydrocarbons in the formation. By using a solvent that has solvency for both the formation oil and carbon dioxide, the sweeping action of the carbon dioxide bank will remove more formation oil from the sandstone formation. The choice of solvents is governed by crude oil characteristics. For crude oils containing asphaltenes, aromatic solvents such as toluene, xylene, as well as refined oils containing at least 10% of these materials and more preferably in excess of 20% of them are preferred. For paraffinic crude oils, lower molecular weight paraffins ranging from propanes through decanes (including isomers thereof) as well as refinery cuts high in these materials are preferred. Other useable solvents include (a) mutual solvents such as those disclosed in U.S. Pat. No. 3,481,404 and U.S. Pat. No. 3,902,557, the disclosures of which are incorporated herein by reference, (b) alcohols such as IPA, (c) micellar solvents, and (d) low molecular weight alkanes such as pentane, hexane, and the like. The preferred aromatics include toluene, xylene, and the like.

The solvent may include mixtures of the above and should have a viscosity of not more than 10 cp at formation conditions. Crude oils and refined oil preferably have a gravity of 27 degrees API or higher.

Formation Conditioning Fluid: The primary function of this fluid is to displace the oil out of the near wellbore region by miscible displacement and avoid contact between oil (or oil and solvent mixtures) and the reactive hydrofluoric acid in the mud acid. Useable fluids include (in order of preference) carbon dioxide, and mixtures of carbon dioxide with micellar solvents and mutual solvents. Since the treatment should leave the sand water wet in this region, it may in some cases be preferred to employ an aqueous surfactant solution in the conditioning fluid, although the latter is not generally necessary.

The carbon dioxide injected may comprise from 1 to 20 pore volumes of the damaged zone to be acidized, and since this region is generally within 2 to 3 feet of the wellbore, the volume of carbon dioxide required per foot of formation thickness may vary from 10 to 400 cubic feet of carbon dioxide measured at reservoir conditions. Liquid carbon dioxide may be used along with aqueous solutions of other additives such as surfactants, solvents, or salts etc.

The liquid carbon dioxide at the surface may be converted in the deeper formations to gas by the time it reaches the formation. Thus, bank 14 in passing through the near wellbore region will be dissolved in indigenous oil (or in the solvent having indigenous oil dissolved therein) and form a miscible bank as it moves outwardly into the formation. This low viscosity bank sweeps oil and solvent ahead of it and surfactant, if present in the fluid, leaves the sand water wet. This conditioning of the formation in the zone to be treated maximizes the effects of the subsequent acidizing steps of the process.

In some formations and with certain oils it is also preferred to employ a micellar solvent with the carbon dioxide as the conditioning solvent to displace the oil and solvent bank 13 and water wet the formation sand and clays to enhance oil removal therefrom. These micellar solvents contain high molecular weight, acid insoluble polar organic components. The preferred micellar solvent is a blend of ethoxylated alcohols, immiscible alcohols, containing from 4 to 10 carbon atoms, and a surfactant capable of dispersing the immiscible alcohols as a micelle in water or acid.

Likewise, mutual solvents, which include the mono, di, tri, and tetra ethylene glycols of the mono ethers, containing 4 to 10 carbon atoms, may also be useful for miscibly displacing the oil and water-wetting the remaining formation surfaces.

The formation conditioning solution preferably should be free of any reactive components such as HCl or HF to avoid mixing the spent acid products with the incompletely displaced oil.

Acid Preflush: The acid preflush is preferably a 7½% to 15% solution of HCl, although other acids such as nitric and carboxylic acids (e.g., formic, acetic, and propionic) may be used. The acid preflush, in addition to reacting with calcite or other pore materials in the formation, miscibily displaces connate water, and provides the additional function in one embodiment of separating the preceding conditioning fluids and connate water from the bank containing reactive HF.

Mud Acid Solution: The mud acid typically is a mixture of from 6% to 12% HCl and 1.5% to 3% HF, although, formulations containing either lesser or greater amounts of HF would be usable with the current process. Common practice employs formulations such as 6% HCl, 1.5% HF; or 12% HCl, 3% HF.

Afterflush: The afterflush displaces the preceding mud acid from the near-wellbore region into the formation. The afterflush may be aqueous (e.g., ammonium chloride or HCl acid) or hydrocarbon liquid (e.g., diesel oil, or light crude oil) but preferably should include a mutual solvent to enhance water wetability of the sandstone formation.

Other Additives: The solutions injected into the formation will include corrosion inhibitors and may include other additives such as surfactants, iron chelating agents, demulsifying agents, etc.

Operations: In carrying out the method of the present invention, conventional equipment and techniques may be employed. Generally, each fluid or solution will be premixed and injected into this formation in the proper sequence and at matrix injection rates and pressures. Fracturing pressures which have been shown to be detrimental (e.g., Acidizing Fundamentals, cited above) are to be avoided.

Although the relative proportions of each fluid or solution may vary within a wide range, the following presents preferred volumes per foot of formation treated.

| | BROAD RANGE (Gal.) | PRE-FERRED RANGE (Gal.) | MOST PREFERRED RANGE (Gal.) |
|---|---|---|---|
| Solvent: sufficient to displace the acid preflush or formation oil outwardly and to maintain a solvent bank in advance of the conditioning fluid. | — | — | — |
| Formation Conditioning Fluid* (at surface) | 20-2000 | 50-1000 | 100-500 |
| Acid Preflush | 10-300 | 20-100 | 35-60 |
| Mud Acid Treatment | 10-300 | 20-200 | 50-150 |
| Afterflush | [equal to mud acid volume or some small multiple thereof, e.g., 1.0 to 1.5] | | |

*Under pressure and temperature conditions at the surface to cause the fluid to be in the liquid state.

As a general rule, the volume of each fluid is related to the pore volume of the near-wellbore region to be treated.

After placement of the afterflush, the well should be turned around and produced immediately.

What is claimed is:

1. In a method of matrix acidizing a sandstone oil bearing formation wherein an acid solution containing HF is injected into the formation to react with clays therein, the improvement wherein the following fluids are injected into the formation in advance of the acid solution:
   (a) a conditioning fluid selected from the group consisting of carbon dioxide and mixtures of carbon dioxide and another solvent;
   (b) an aqueous acid preflush solution; and
   (c) a solvent having solvency for the oil in the formation and being at least partially soluble in the carbon dioxide, said solvent being injected into the formation in advance of the conditioning fluid.

2. The method of claim 1 wherein fluids (a), (b), and (c) are injected into the formation is in the following order:
   (b); (c); and (a).

3. The method of claim 1 wherein the fluids (a), (b), and (c) are injected into the formation in the following sequence:
   (c); (a); and (b).

4. The method of claim 1 wherein the solvent (c) is more soluble in the carbon dioxide than the formation oil.

5. The method of claim 1 wherein the solvent (c) is high in aromatic content.

6. The method of claim 1 wherein the solvent (c) is selected from the group consisting of toluene, xylene, crude oils, and refined oils, alcohols, micellar solvents, and straight chain hydrocarbons having from 3 to 10 carbon atoms, said solvent having a viscosity at formation temperatures of less than 10 cp.

7. The method of claim 1 wherein the acid solution contains 1.5 to 3 percent HF and 6 to 12 percent HCl.

8. The method of claim 1 wherein the acid preflush is aqueous HCl.

9. The method of claim 1 and further comprising injecting an afterflush into the formation to displace the previous fluids radially outwardly in the formation and water-wet the sandstone.

10. A method of matrix acidizing a sandstone, oil-bearing formation surrounding a wellbore which comprises:
 (a) injecting through the wellbore and into the formation an aqueous acid preflush solution to react with calcareous material therein;
 (b) injecting through the wellbore and into the formation a solvent to displace the acid preflush outwardly in the formation, said solvent having solvency for the oil in the formation;
 (c) injecting a conditioning fluid through the wellbore and into the formation to displace the solvent outwardly into the formation, said conditioning fluid being selected from the group consisting of carbon dioxide and a mixture of carbon dioxide and a solvent; the solvent of step (b) being soluble at least in part in the carbon dioxide or mixture;
 (d) injecting an acid solution containing HF into the formation to react with clays or other materials in the formation; and
 (e) injecting an afterflush liquid into the formation to water-wet the formation and to displace the preceding fluids radially outwardly from the wellbore.

11. The method of claim 10 and further comprising the step of flowing formation fluids from the formation into the wellbore.

* * * * *